United States Patent
Ito et al.

(10) Patent No.: US 8,176,807 B2
(45) Date of Patent: May 15, 2012

(54) CONTROL UNIT FOR AUTOMATIC TRANSMISSION

(75) Inventors: Yoshinobu Ito, Anjo (JP); Michimasa Tanaka, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 835 days.

(21) Appl. No.: 12/285,065

(22) Filed: Sep. 29, 2008

(65) Prior Publication Data

US 2009/0139362 A1 Jun. 4, 2009

(30) Foreign Application Priority Data

Sep. 28, 2007 (JP) ................................. 2007-253351

(51) Int. Cl.
*B60K 17/04* (2006.01)
(52) U.S. Cl. .................................................... 74/473.12
(58) Field of Classification Search .............. 74/335, 74/89.32, 89.34, 473.12, 473.25; 192/220.2; 180/333, 336; 701/51
See application file for complete search history.

(56) References Cited

U.S. PATENT DOCUMENTS

| | | | |
|---|---|---|---|
| 6,487,484 B1 * | 11/2002 | Shober et al. | 701/51 |
| 7,137,499 B2 * | 11/2006 | Riefe et al. | 192/220.2 |
| 7,146,871 B2 * | 12/2006 | Ozaki et al. | 74/335 |
| 7,278,510 B1 * | 10/2007 | Richards | 180/336 |
| 2004/0139815 A1 * | 7/2004 | Shimamura et al. | 74/335 |
| 2004/0216549 A1 * | 11/2004 | Shiomi et al. | 74/473.12 |
| 2004/0261559 A1 | 12/2004 | Ozaki et al. | |
| 2007/0017310 A1 | 1/2007 | Matsuzaki et al. | |

FOREIGN PATENT DOCUMENTS

| | | |
|---|---|---|
| JP | A-2003-314686 | 11/2003 |
| JP | A-2005-207570 | 8/2005 |
| JP | A-2007-010042 | 1/2007 |

* cited by examiner

*Primary Examiner* — Robert Pezzuto
(74) *Attorney, Agent, or Firm* — Oliff & Berridge, PLC (57) ABSTRACT

An automatic transmission control unit includes a shift-by-wire control circuit that inputs an electrical signal based on a selected range selected by a driver, changes a range changeover member of an automatic transmission using the rotation of a motor to a predetermined position based on the electrical signal, and outputs a signal that drives the motor so as to achieve a travel range; and an automatic transmission control circuit that inputs the electrical signal based on the selected range and a signal based on a vehicle state and outputs a signal for controlling the automatic transmission in order to achieve the travel range, wherein the shift-by-wire control circuit and the automatic transmission control circuit are accommodated in one storage portion.

9 Claims, 8 Drawing Sheets

CONTROL UNIT FOR AUTOMATIC TRANSMISSION

INCORPORATION BY REFERENCE

The disclosure of Japanese Patent Application No. 2007-253351 filed on Sep. 28, 2007 including the specification, drawings and abstract is incorporated herein by reference in its entirety.

BACKGROUND

The present invention relates to an automatic transmission control unit.

Figure 8:
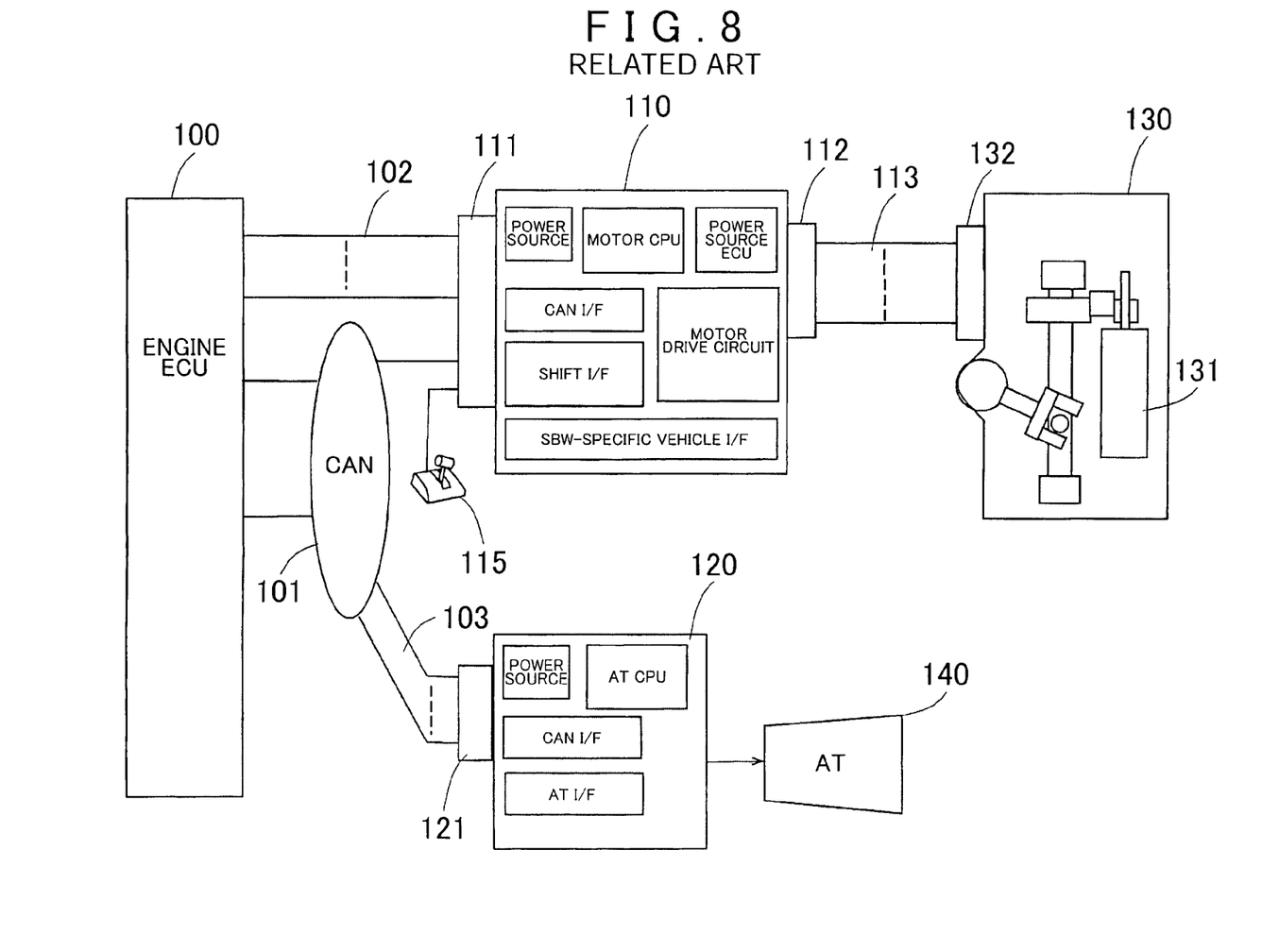
FIG. 8 is an electrical connection diagram of a conventional automatic transmission control unit.

There exists a vehicle mounted with a shift-by-wire system equipped with an actuator 130 that changes a travel range of a vehicle automatic transmission 140, and a shift-by-wire control circuit (referred to as an SBW-ECU below) 110 that controls the actuator 130 (with a motor 131) based on a required range selected by a driver, as shown in FIG. 8. An automatic transmission control circuit (referred to as an AT-ECU below) 120 is mounted in the vehicle that controls various valves of a hydraulic control device of the automatic transmission 140. The actuator 130, the SBW-ECU 110, and the AT-ECU 120 are separately accommodated in a case, with the SBW-ECU 110 and the AT-ECU 120 connected via connectors 111, 121 by harnesses 102, 103 to an engine ECU 100 that controls an engine. The SBW-ECU 110 and the actuator 130 are connected via connectors 112, 132 by a harness 113. The engine ECU 100, the SBW-ECU 110, and the AT-ECU 120 are connected to an onboard communication system CAN (Controller Area Network) 101, and are capable of communicating with one another according to CAN protocol. The SBW-ECU 110 includes a power source, a motor CPU, a power source CPU, a CAN interface, a motor drive circuit, a shift interface, and an SBW-specific vehicle interface, and is also connected with a shift lever 115 via the connector 111. The AT-ECU 120 includes a power source, an AT CPU, a CAN interface, and an AT interface, and is connected with the automatic transmission 140.

However, since the actuator 130, the SBW-ECU 110, and the AT-ECU 120 are separately accommodated in the case according to the above conventional shift-by-wire system and the like, respective onboard spaces must be provided, which causes an increase in the overall size of the system. In addition, the SBW-ECU 110 sends a drive current of the actuator 130 to an internal layer pattern of a printed circuit board, thereby increasing the size of the printed circuit board and the overall size of the system as a consequence. The actuator 130, the SBW-ECU 110, and the AT-ECU 120 being separately accommodated in a case, and the SBW-ECU 110 and the AT-ECU 120 having similar circuit functions including power sources and CAN interfaces, also results in an increased number of parts and manufacturing costs.

A shift-by-wire system that integrates the actuator and the SBW-ECU has been proposed in Japanese Patent Application Publication No. JP-A-2007-10042 as a countermeasure. According to this shift-by-wire system, the actuator and the SBW-ECU are stored in one case, which enables downsizing.

SUMMARY

According to the shift-by-wire system described in Japanese Patent Application Publication No. JP-A-2007-10042, however, the AT-ECU is stored in a separate case, which leaves room for further downsizing. Furthermore, since the SBW-ECU and the AT-ECU respectively have similar circuit functions, this results in an increased number of parts and manufacturing costs.

The present invention was devised in light of the foregoing problem, and it is an object of the present invention to provide an automatic transmission control unit that includes a shift-by-wire system and an automatic transmission control circuit, whereby downsizing can be achieved and manufacturing costs can be reduced. The present invention can also achieve various other advantages.

According to an exemplary aspect of the invention, an automatic transmission control unit includes a shift-by-wire control circuit that inputs an electrical signal based on a selected range selected by a driver, changes a range changeover member of an automatic transmission using the rotation of a motor to a predetermined position based on the electrical signal, and outputs a signal that drives the motor so as to achieve a travel range; and an automatic transmission control circuit that inputs the electrical signal based on the selected range and a signal based on a vehicle state and outputs a signal for controlling the automatic transmission in order to achieve the travel range, wherein the shift-by-wire control circuit and the automatic transmission control circuit are accommodated in one storage portion.

According to an exemplary aspect of the invention, an automatic transmission control unit includes a shift-by-wire control circuit that inputs an electrical signal based on a selected range selected by a driver, changes a range changeover member of an automatic transmission using the rotation of a motor to a predetermined position based on the electrical signal, and outputs a signal that drives the motor so as to achieve a travel range; an automatic transmission control circuit that inputs the electrical signal based on the selected range and a signal based on a vehicle state and outputs a signal for controlling the automatic transmission in order to achieve the travel range; and a separation wall, wherein the motor is disposed on one side of the separation wall and the shift-by-wire control circuit and the automatic transmission control circuit are disposed on another side of the separation wall.

BRIEF DESCRIPTION OF THE DRAWINGS

Various exemplary aspects of the invention will be described with reference to the drawings, wherein.

DETAILED DESCRIPTION OF EMBODIMENTS

Figure 1:
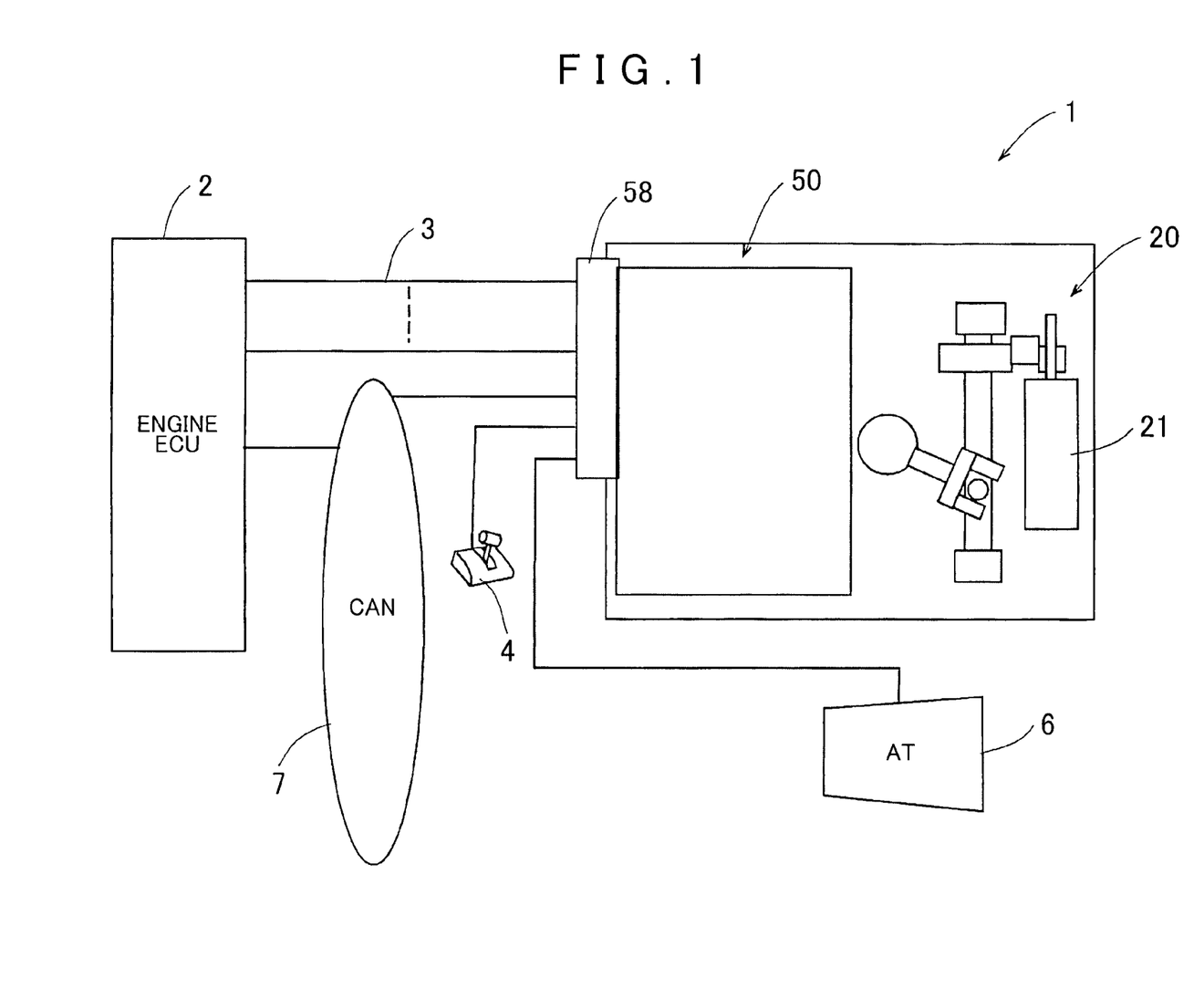
FIG. 1 is an electrical connection diagram of an automatic transmission control unit according to an embodiment.

An embodiment that realizes an automatic transmission control unit according to the present invention will be described below with reference to the accompanying drawings. As FIG. 1 shows, an automatic transmission control unit 1 of the embodiment is connected to an engine ECU 2 by a harness 3 via a connector 58, and also connected to a shift lever 4 and an automatic transmission 6. Here, the engine ECU 2 controls an engine, and the shift lever 4 is operated by a driver to select and set a selected range in order to set a travel range of the automatic transmission 6 to a desired range. The automatic transmission 6 automatically changes a transmission gear ratio in accordance with a vehicle speed and an engine speed. The automatic transmission control unit 1 and the engine ECU 2 are connected by an onboard communication system CAN (Controller Area Network) 7 for example, and are capable of communicating with one another.

The automatic transmission control unit 1 is provided with an actuator 20 and a control circuit mechanism 50. The actuator 20 is provided with a motor 21 that changes a travel range (such as P, R, N, D, D1, and D2) of the automatic transmission 6, while the control circuit mechanism 50 includes one printed circuit board 51 mounted with a shift-by-wire control circuit (referred to as an SBW-ECU below) 53, an automatic transmission control circuit (referred to as an AT-ECU below) 56, and the like as will be explained later (see FIG. 6).

Figure 2:
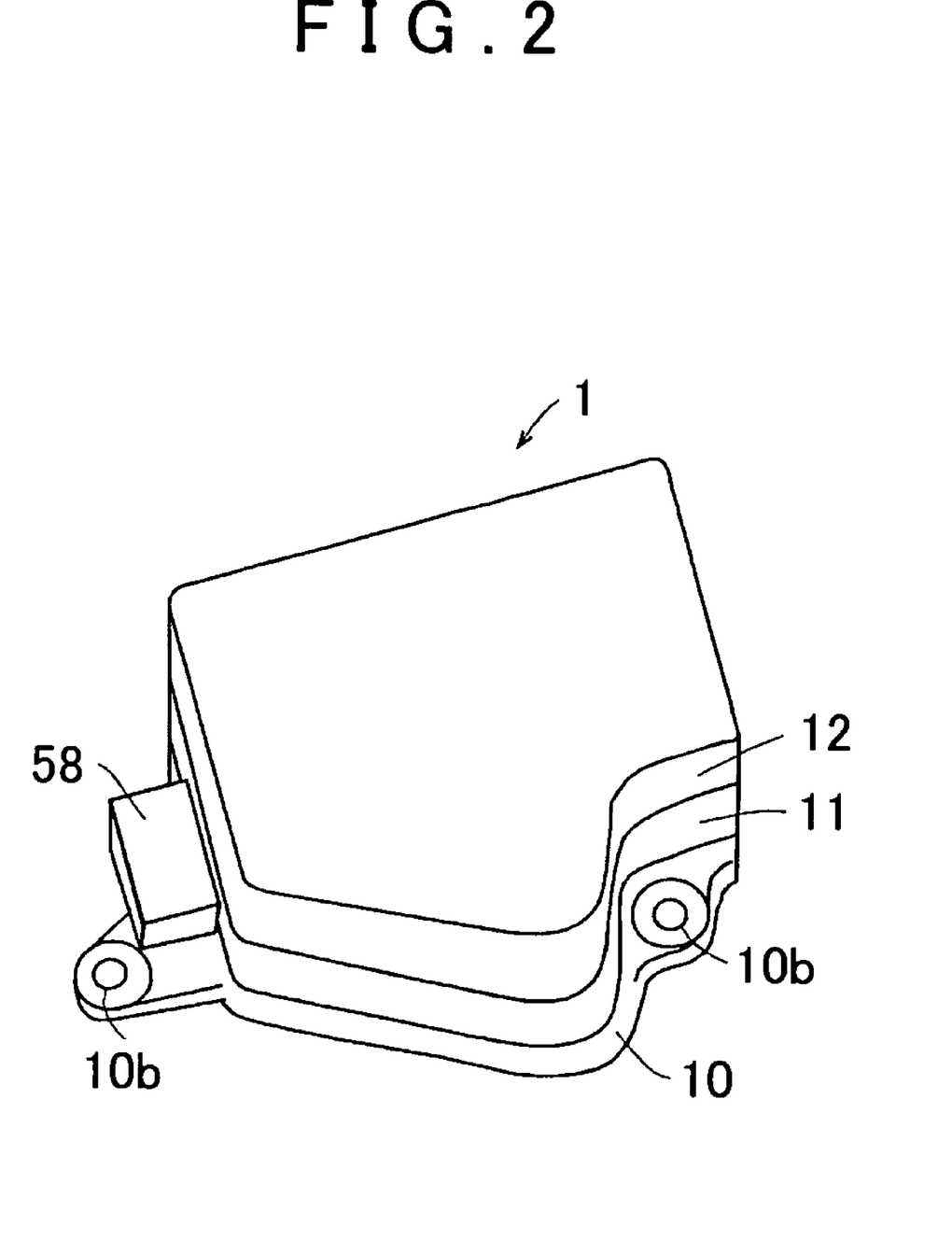
FIG. 2 is a perspective view of the automatic transmission control unit according to the embodiment.

FIG. 2 is a view of an outer appearance of the automatic transmission control unit 1. A case of the automatic transmission control unit 1 is structured from a case body 10, an inner lid 11, and a top lid 12 all made of metal. The connector 58 projects from between the case body 10 and the inner lid 11. Note that the case body 10, the inner lid 11, and the top lid 12 may instead be made of resin. The automatic transmission control unit 1 is fixed by a bolt to a case of the automatic transmission 6 using an attachment hole 10b provided in the case body 10, and thereby fixed to the case of the automatic transmission 6.

Figure 3:
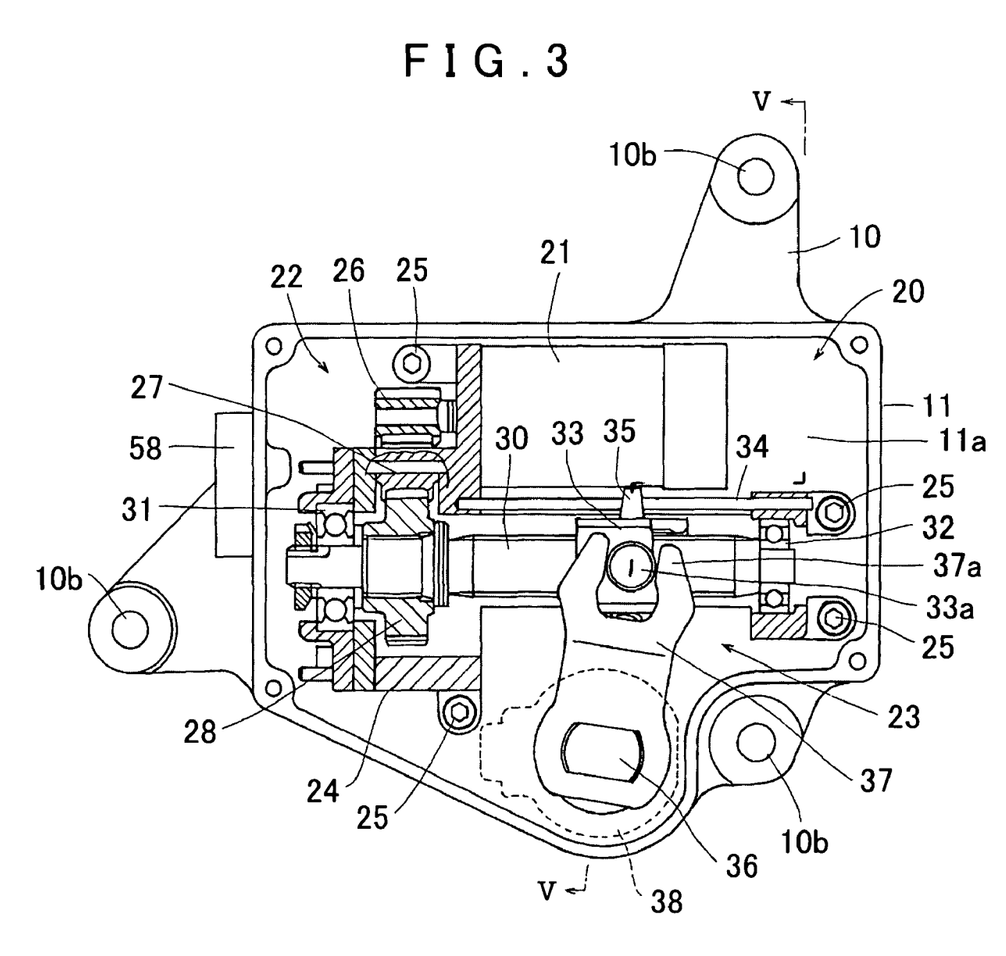
FIG. 3 is a frontal view of the automatic transmission control unit according to the embodiment.

FIG. 3 is a frontal view of the actuator 20 with the top lid 12 removed. The actuator 20 is structured from the motor 21, a reduction mechanism 22, a motion conversion mechanism 23, and the like. Also, the actuator 20 is accommodated within an upper space inside an upper storage portion 12a (see FIG. 5) formed by the upper lid 12 and the inner lid 11, whose bottom surface includes a separation wall 11a. Reference numeral 24 denotes a main bracket made of metal separate from the separation wall 11a which, after attachment to the motor 21, the reduction mechanism 22, the motion conversion mechanism 23, and the like, is fixed to the separation wall 11a of the inner lid 11 by four bolts 25. The motor 21 is fixed to the main bracket 24, and an output shaft of the motor 21 passes through the main bracket 24 to project forward with a small gear 26 fitted to a distal end portion thereof. The motor 21 is a three-phase brushless motor, and is attached with a sensor that sends a pulse signal each time the output shaft rotates a unit angle. The motor 21 used is compact so as to enable storage within the inner lid 11.

Inside the inner lid 11, a ball screw shaft 30 is arranged parallel to the motor 21 and both ends of the ball screw shaft 30 are rotatably and axially supported on the main bracket 24 via bearings 31, 32. A front end side of the ball screw shaft 30 is fixed with a large gear 28 that meshes via the small gear 26 and an intermediate gear 27. The small gear 26, the intermediate gear 27, and the large gear 28 structure the reduction mechanism 22. Note that in the present embodiment, the rotation of the motor 21 decelerated by the small gear 26, the intermediate gear 27, and the large gear 28 is transferred to the ball screw shaft 30. However, the rotation of the motor 21 may be decelerated by a planetary gear, a worm gear, or the like, and then transferred to the ball screw shaft 30.

Figure 5:
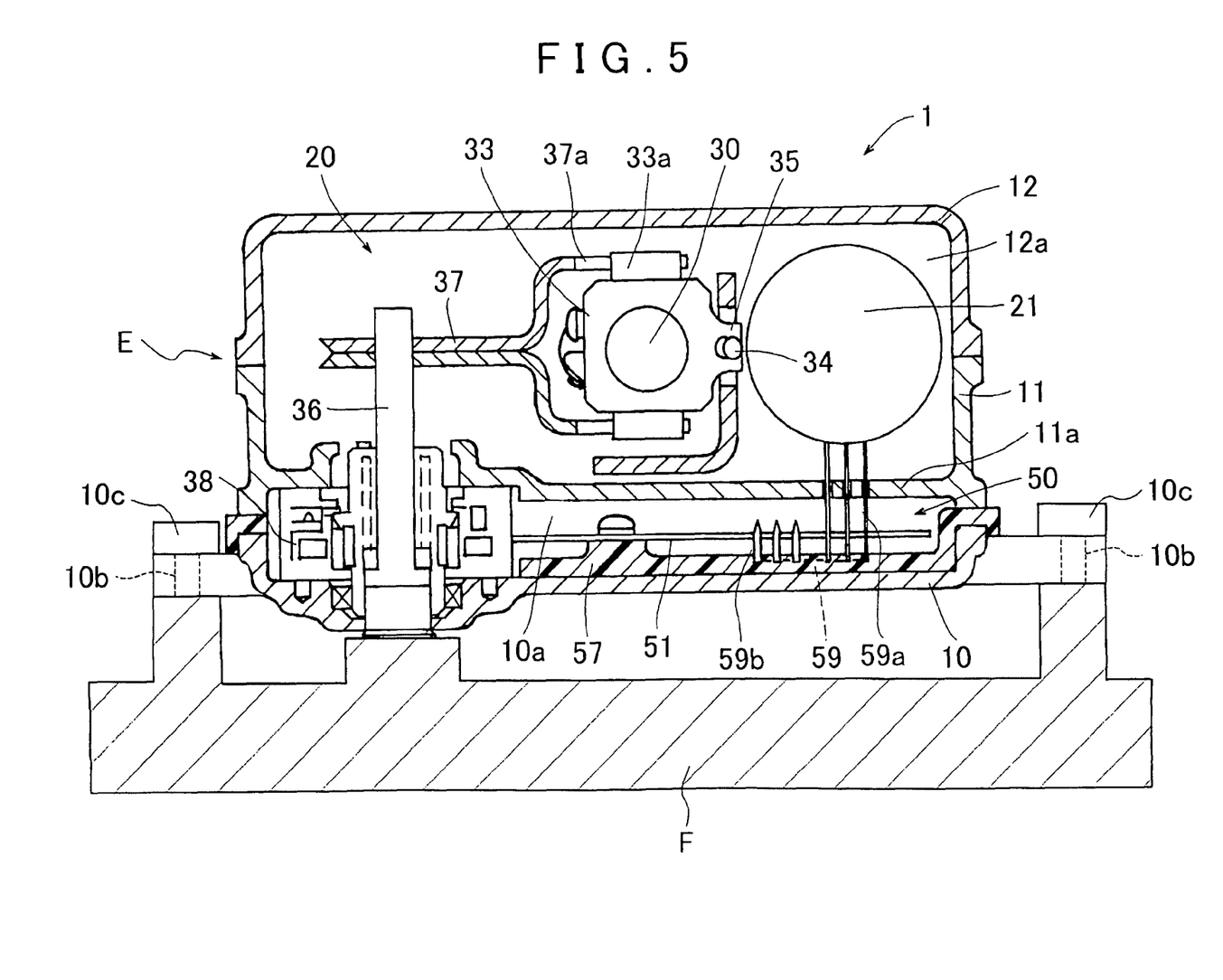
FIG. 5 is a cross-sectional view taken along arrows V-V in FIG. 3 of the automatic transmission control unit according to the embodiment.

As FIG. 5 also shows, the ball screw shaft 30 is threadedly engaged with a ball nut 33. Both ends of an engagement rod 34 that extends parallel to the ball screw shaft 30 are fitted to the main bracket 24. A C-shaped engagement portion 35 that protrudes toward an outer periphery of the ball nut 33 is engaged with the engagement rod 34, and the ball nut 33 is held movable in an axial direction with respect to the main bracket 24. Thus, rotation of the motor 21 is decelerated by the reduction mechanism 22 and transferred to the ball screw shaft 30, and rotation of the ball screw shaft 30 is converted into axial motion of the ball nut 33 by the ball screw shaft 30, the ball nut 33, and the like.

A manual shaft 36 rotatably supported on the case body 10 passes through the separation wall 11a and projects upward. A base end portion of an arm 37 is fitted to the manual shaft 36 with a relative rotation of the arm 37 thus regulated and the arm 37 supported capable of oscillation. A distal end of the arm 37 branches into two and extends toward both sides of the ball nut 33, where respective concave portions 37a are formed on the distal ends. Through engagement of the concave portions 37a with an engagement shaft 33a provided extending toward both sides of the ball nut 33, the arm 37 is engaged with relative movement thereof in the axial direction of the ball screw shaft 30 regulated. The ball screw shaft 30, the ball nut 33, the arm 37, the engagement shaft 33a, the concave portion 37a, and the like structure the motion conversion mechanism 23. In addition, an end of the manual shaft 36 is attached to the position sensor 38.

Figure 4:
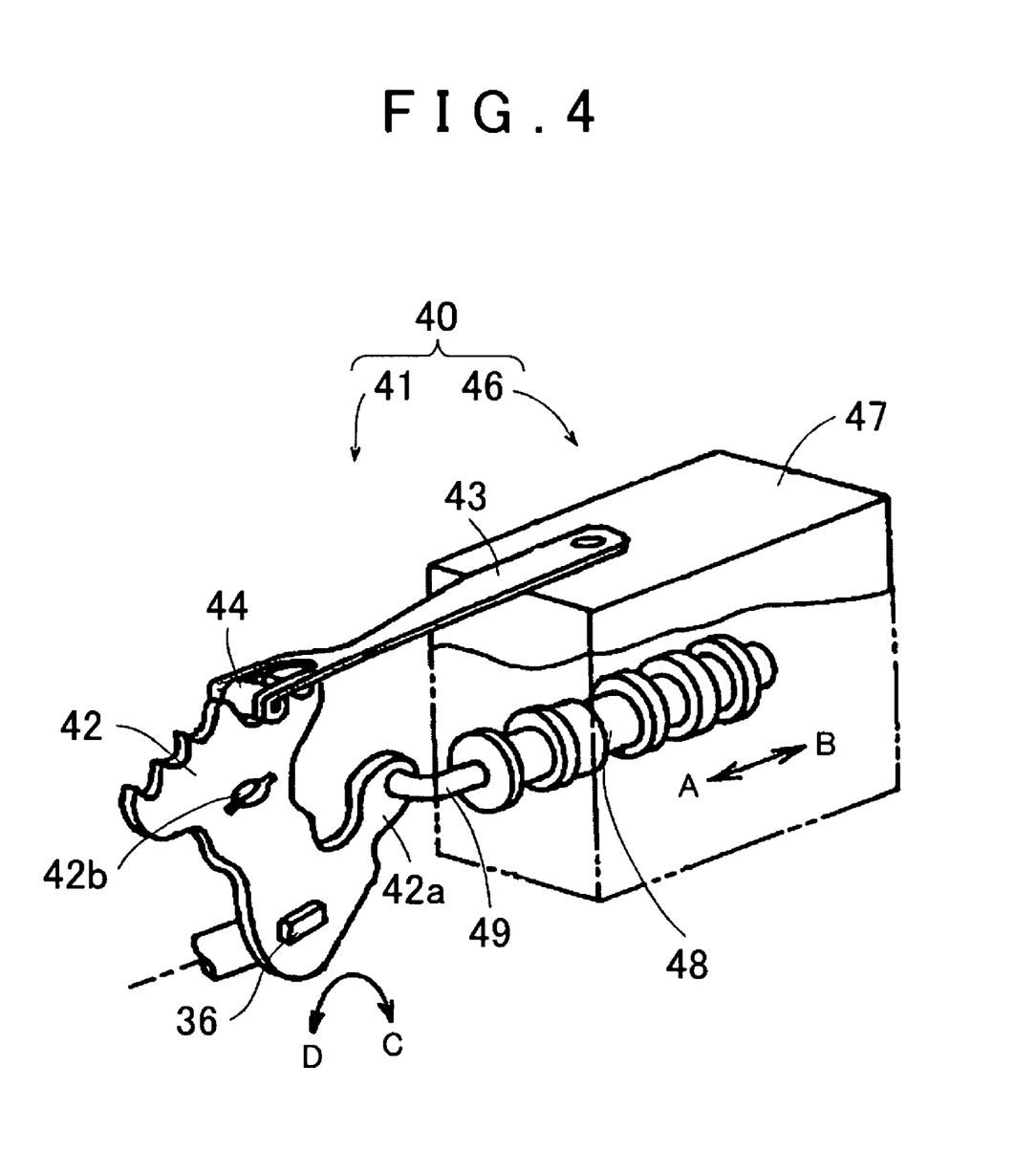
FIG. 4 is a perspective view of a range changeover mechanism for the automatic transmission control unit according to the embodiment.

Another end of the manual shaft 36 is connected with a range changeover mechanism 40 subject to driving by the actuator 20, as shown in FIG. 4. The range changeover mechanism 40 is provided in the automatic transmission 6 (see FIG. 7). The range changeover mechanism 40 is formed from a detent mechanism 41 and a manual valve 46 that serves as a range changeover member. The manual valve 46 is structured such that a spool 48 is fitted movable in an axial direction (the directions of arrows A and B) within a valve body 47. The spool 48 changes an oil passage of line pressure in accordance with a selected range selected by the shift lever 4, and changes a drive state of the automatic transmission 6 to a travel range such as a P-range (parking range), an R-range (reverse range), an N-range (neutral range), and a D-range (driving range). The shift lever 4 is set such that ranges corresponding to the travel ranges of the automatic transmission 6 can be selected. Namely, the spool 48 disposed within a hydraulic control device 64 of the automatic transmission 6 is capable of moving to a P-position corresponding to the P-range, an R-position corresponding to the R-range, an N-position corresponding to the N-range, a D-position corresponding to the D-range, and the like. Moving the spool 48 in the axial direction (the directions of the arrows A and B) changes the oil passage within the hydraulic control device 64, whereby the travel range of the automatic transmission 6 is set so as to be a range selected by the shift lever 4, i.e., a required range. A portion projecting from the valve body 47 of the spool 48 is formed with a hook portion 49 bent into an L shape. The hook portion 49 is connected to a shift portion 42a that is formed on a detent lever 42 (to be described later) of the detent mechanism 41. Rotation of the detent lever 42 moves the spool 48 in the axial direction.

The detent mechanism 41 is structured from the detent lever 42, a detent spring 43, and an engagement roller 44. The detent lever 42 is fitted with the manual shaft 36, which is in spline engagement with another end of the manual shaft 36, and integrally rotates with the arm 37. Accordingly, the detent lever 42 rotates in the directions of arrows C and D with the manual shaft 36 serving as the center of rotation. The detent lever 42 is also provided with a through hole 42b that is engaged with a portion of a parking mechanism (not shown). The position sensor 38, which is attached to an end of the manual shaft 36, detects a rotational position of the detent lever 42 so as to detect a current position of the spool 48. A potentiometer, for example, may be used as the position sensor 38, with the potentiometer outputting a voltage in accordance with a rotational angle of the manual shaft 36. The range position (P-position, R-position, N-position, and D-position) can thus be detected as a zone of a predetermined width depending on the voltage level output from the potentiometer.

FIG. 5 is a cross-sectional view of the automatic transmission control unit 1. The automatic transmission control unit 1 is provided with one case (a control unit case E) structured from the case body 10, the inner lid 11, and the top lid 12, which are all made of metal, and also provided with the actuator 20 and the control circuit mechanism 50 accommodated within the case. A lower surface of a resin portion 57 of the control circuit mechanism 50 is adhered by an adhesive to an upper surface of the case body 10. In addition, the case body 10 and the inner lid 11 are fixed by a bolt in a state where a portion other than the connector 58 among an outer peripheral portion of the resin portion 57 of the control circuit mechanism 50 is sandwiched therebetween via a seal member. The inner lid 11 is provided with the separation wall 11a that forms a lower space with the case body 10. A lower storage portion 10a is formed by fixing the case body 10 and the inner lid 11 in such a manner, with the control circuit mechanism 50 and the position sensor 38 accommodated within the lower storage portion 10a. In other words, the SBW-ECU 53, i.e., the shift-by-wire control circuit, and the AT-ECU 56, i.e., the automatic transmission control circuit, are accommodated in the lower space within the lower storage portion 10a. By covering the inner lid 11 with the top lid 12 and fixing the top lid 12 thereto, the upper storage portion 12a is formed between the inner lid 11 and the top lid 12, and the actuator 20 is accommodated within the upper storage portion 12a. In addition, the case body 10 is provided with a bolt hole 10b, and the control unit case E is fixed to a case F of the automatic transmission 6 by a bolt 10c.

Figure 6:
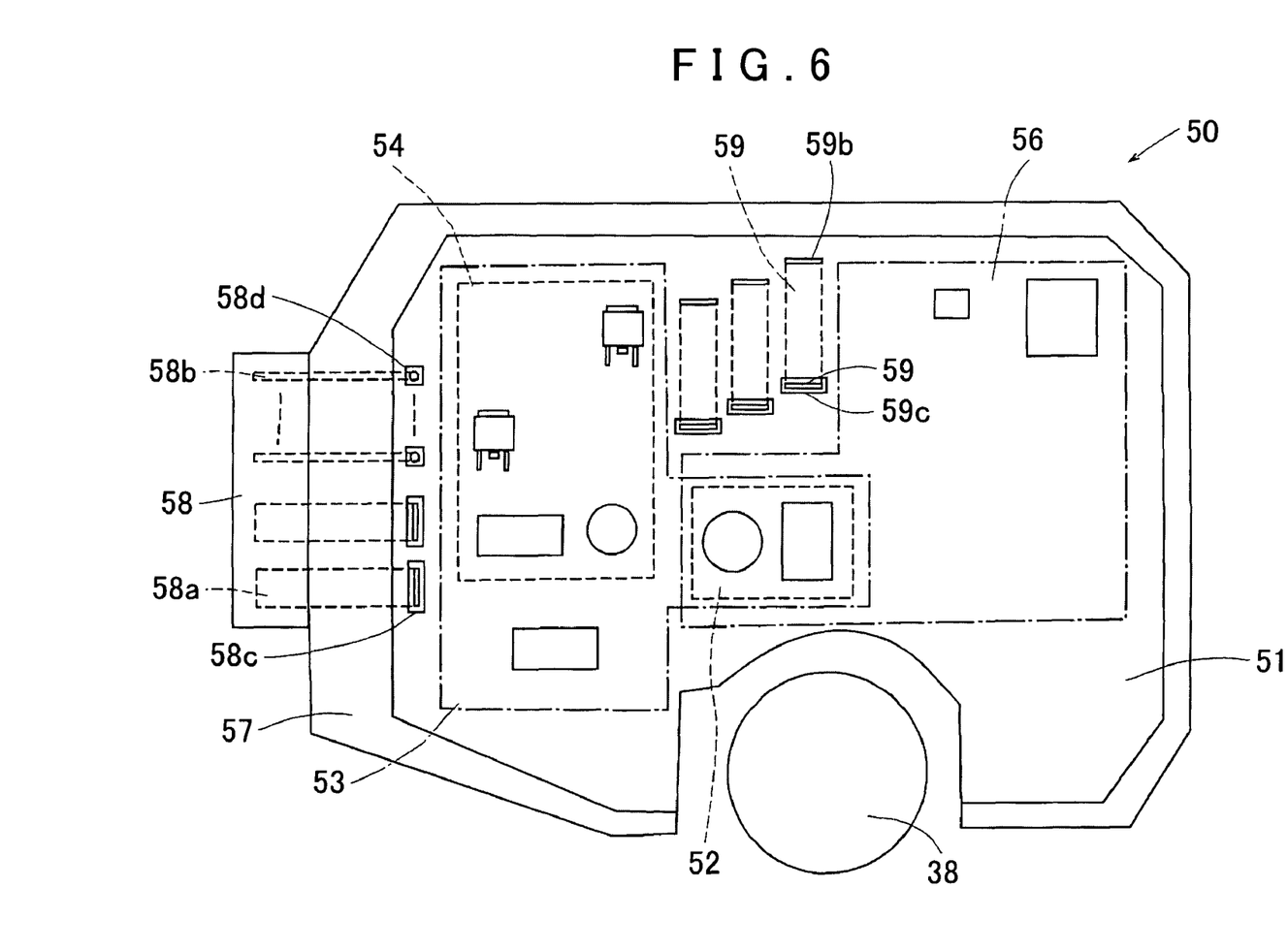
FIG. 6 is a frontal view of a control unit for the automatic transmission control unit according to the embodiment.

The control circuit mechanism 50, as shown in FIG. 6, includes the printed circuit board 51, the resin portion 57, and the connector 58. The printed circuit board 51 is threadedly fixed on the plate-shaped resin portion 57. Mounted on the printed circuit board 51 are electronic components structuring the SBW-ECU 53 serving as the shift-by-wire control circuit and the AT-ECU 56 serving as the automatic transmission control circuit. The SBW-ECU 53 and the AT-ECU 56 share a power circuit 52, and the SBW-ECU 53 includes a motor drive circuit 54. Here, the SBW-ECU 53 drives the actuator 20 based on a selected range selected by the driver. Namely, the SBW-ECU 53 controls an electrical signal that drives the motor 21 in accordance with an electrical signal based on the selected range. By controlling various valves of a hydraulic control device of the automatic transmission 6 based on information such as an operating state of the engine as input from the engine ECU 2, the AT-ECU 56 changes an engagement state of clutches and brakes in order to change a shift state. Namely, the AT-ECU 56 controls a signal that controls a valve of the hydraulic control device of the automatic transmission 6 in order to achieve a travel range. Furthermore, the power circuit 52 stabilizes a power voltage at a predetermined voltage, which is then supplied to the SBW-ECU 53 and the AT-ECU 56. The motor drive circuit 54 supplies a motor drive current to the motor 21.

An end of the resin portion 57 is formed integrated with the connector 58, which is exposed to outside of the control unit case E, and the connector 58 is provided with a power terminal 58a and a signal terminal 58b. The connector 58 is internally divided among each of the engine ECU 2, the shift lever 4, the automatic transmission 6, and the CAN 7, and electrically connectable with these. The power terminal 58a supplies power to the power circuit 52. An end of the power terminal 58a projects into the connector 58 and passes through the inside of the resin portion 57, while another end bent into an L shape projects from the resin portion 57 and is soldered to a land 58c of the printed circuit board 51. The power terminal 58a is connected with an IC of the power circuit 52 via a pattern connected with the land 58c. The signal terminal 58b transfers signals from sensors and commands or the like from the AT-ECU 56. An end of the signal terminal 58b projects into the connector 58 and passes through the inside of the resin portion 57, while another end bent into an L shape projects from the resin portion 57 and is soldered to a land 58d of the printed circuit board 51. The signal terminal 58b is connected with the SBW-ECU 53 and the AT-ECU 56 via a pattern connected with the land 58d. In this manner, an electrical insulation property is secured by passing the power terminal 58a and the signal terminal 58b through the inside of the resin portion 57.

A positional relationship of the connector 58 with the SBW-ECU 53 and the AT-ECU 56 is such that the SBW-ECU 53 is disposed closer than the AT-ECU 56 to the connector 58. The SBW-ECU 53 controls a relatively large amount of electrical power for driving the motor 21, and thus supplies a larger amount of electrical power than the AT-ECU 56. Accordingly, the SBW-ECU 53 is preferably disposed closer than the AT-ECU 56 to the connector 58 side. Disposing the AT-ECU 56 closer to the connector 58 side instead means that the AT-ECU 56 is placed between the SBW-ECU 53 and the connector 58. Consequently, noise generated from the power line that supplies a relatively large amount of electrical power for driving the motor 21 may affect the AT-ECU 56 and the position sensor 38 in proximity to the AT-ECU 56 and lead to a detection error. According to the present invention, the SBW-ECU 53 is disposed closer than the AT-ECU 56 to the connector 58. Therefore, noise generated from the power line that supplies a relatively large amount of electrical power for driving the motor 21 can be prevent from affecting the AT-ECU 56 and the position sensor 38.

A bus bar 59 serves as a conductor that conducts the motor drive current. As FIGS. 5 and 6 illustrate, both ends 59a, 59b are bent into an L shape, and the end 59a is soldered to a land 59c of the printed circuit board 51 that is connected with an IC of the motor drive circuit 54. In addition, the bus bar 59 passes through the inside of the resin portion 57. The other end 59b projects upward from the resin portion 57 and passes through the printed circuit board 51 and the separation wall 11a to connect with the motor 21 of the actuator 20.

Figure 7:
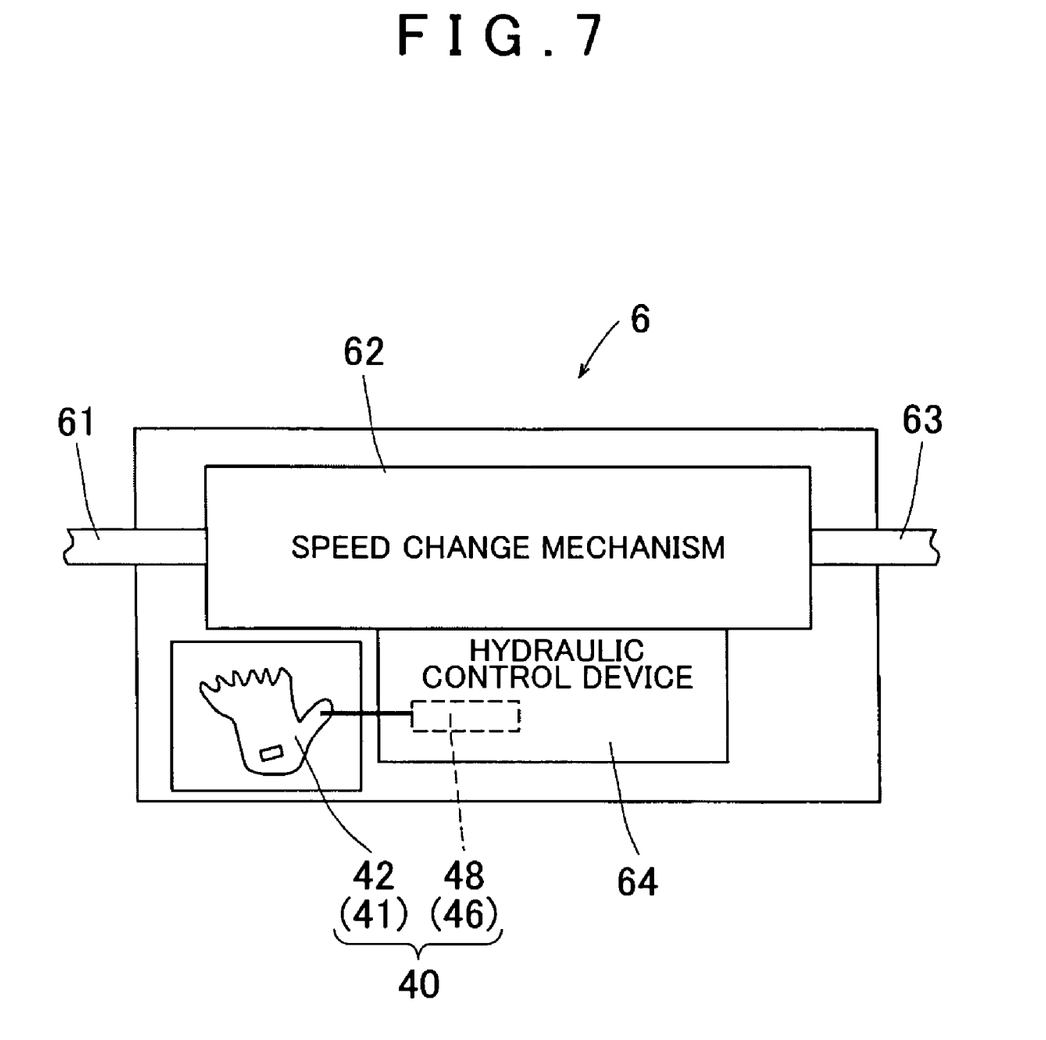
FIG. 7 is a block diagram of an automatic transmission for the automatic transmission control unit according to the embodiment.

FIG. 7. is a block diagram of the automatic transmission 6 subject to the control of the AT-ECU 56. The automatic transmission 6 changes the speed of the driving force of the engine in accordance with the vehicle speed and the engine speed, which is then transferred to a driving wheel after passing through a propeller shaft, a differential, and right and left drive shafts. The automatic transmission 6 includes an input shaft 61, a speed change mechanism 62, an output shaft 63, the hydraulic control device 64, and the range changeover mechanism 40. The input shaft 61 inputs a driving force from the engine. The speed change mechanism 62 is formed from a torque converter, a planetary gear train, and the like, and switches (changes or reverses) a gear speed after receiving an instruction from the hydraulic control device 64, whereby the speed of the driving force input from the input shaft 61 is changed and output. The output shaft 63 outputs a speed-changed power from the speed change mechanism 62 to the driving wheel via the propeller shaft. The hydraulic control device 64 automatically changes the oil passages of the clutches and brakes of gears in the planetary gear train to control the planetary gear train. The range changeover mechanism 40 has already been described above.

A description follows below regarding an operation of the SBW-ECU 53 and the actuator 20 in the automatic transmission control unit 1 with the above structure. When the driver operates the shift lever 4, a shift signal based on the required range selected is input to the SBW-ECU 53 via the signal terminal 58b of the connector 58. A motor drive current based on the shift signal is then supplied from the SBW-ECU 53 to the motor 21 via the bus bar 59.

Accordingly, the motor 21 is driven in a predetermined driving direction, and rotational motion of the output shaft of the motor 21 is decelerated by the reduction mechanism 22 and transferred to the ball screw shaft 30 supported on the main bracket 24. Rotation of the ball screw shaft 30 moves the ball nut 33, whose rotation is regulated by engagement of the engagement rod 39 and the engagement portion 35, in the axial direction to thus rotate the arm 37 around the manual shaft 36. Rotation of the manual shaft 36 rotates the detent lever 42, and the spool 48 is moved via the shift portion 42a.

The SBW-ECU 53 stops rotation of the motor 21 when an output voltage of the position sensor 38 reaches a predetermined value. Once rotation of the motor 21 is stopped, the detent lever is rotated due to the actions of the detent spring 43, the engagement roller 44, and the like, and then held at a predetermined position. In this manner, the spool 48 is changed, which changes the travel range of the automatic transmission 6.

Actions of the AT-ECU 56 will be outlined next. The AT-ECU 56 is input with information indicating an operation state such as the engine speed from the engine ECU 2 via the signal terminal 58b of the connector 58. Based on such information, the AT-ECU 56 outputs to the automatic transmission 6 a control signal that controls various valves of the hydraulic control device of the automatic transmission 6. The engagement states of the clutches and brakes are thus changed to change the shift state.

In the automatic transmission control unit 1 according to the embodiment, the SBW-ECU 53 and the AT-ECU 56 are accommodated in the lower storage portion 10a, which is separate from the upper storage portion 12a that accommodates the motor 21, within one case. There is thus no need to provide respective onboard spaces, and similar circuit functions, e.g. a power circuit, can also be used in common. According to the automatic transmission control unit 1, it is therefore possible to achieve downsizing and a reduction in manufacturing costs. Furthermore, since the SBW-ECU 53 and the AT-ECU 56 are accommodated in the same lower storage portion 10a, lubricant, wear particles, and the like from the motor 21 accommodated in the upper storage portion 12a can be prevented from penetrating to the lower storage portion 10a where the SBW-ECU 53 and the AT-ECU 56 are accommodated.

An outer side of an end of the lower storage portion 10a where the SBW-ECU 53 and the AT-ECU 56 are accommodated is provided with the connector 58, which electrically connects the SBW-ECU 53 and the AT-ECU 56 with the power source. The positional relationship of the connector 58 with the SBW-ECU 53 and the AT-ECU 56 is such that the SBW-ECU 53 is disposed closer than the AT-ECU 56 to the connector 58. Accordingly, the effect of noise generated from the SBW-ECU 53 due to higher power consumption than the AT-ECU 56 in order to control the drive current of the motor 21 can be reduced in comparison to when the AT-ECU 56 is disposed closer than the SBW-ECU 56 to the connector 58. This also makes it possible to reduce a reading error caused by noise generated in the position sensor 38 of the automatic transmission 6, which is disposed near the AT-ECU 56. In addition, there is no need to enact noise countermeasures such as using shielding wire for a harness through which the drive current of the motor 21 flows.

Moreover, mounting the SBW-ECU 53 and the AT-ECU 56 on one printed circuit board 51 enables the easy realization of a compact space and the common use of similar circuit functions.

The upper storage portion 12a accommodating the motor 21 and the lower storage portion 10a, which accommodates the SBW-ECU 53 and the AT-ECU 56, are integratedly joined and fixed to the case F of the automatic transmission 6. There is thus no need to provide respective onboard spaces for the SBW-ECU 53 and the AT-ECU 56, and similar circuit functions can also be used in common.

The lower storage portion 10a accommodating the SBW-ECU 53 and the AT-ECU 56 is provided with the resin portion 57 embedded with the bus bar 59 that electrically connects the motor 21 and the printed circuit board 51. Therefore, the drive current of the motor 21 can flow through the bus bar 59 instead of an inner layer pattern of the printed circuit board 51, thereby downsizing the printed circuit board 51 and also eliminating the need for shielding wire as a noise countermeasure.

The upper storage portion 12a accommodating the motor 21 further accommodates the reduction mechanism 22 that decelerates the rotation of the motor 21, and the motion conversion mechanism 23 that converts the rotation decelerated by the reduction mechanism 22 into an oscillating motion that is transferred to the manual valve 46. Therefore, lubricant present in the motor 21 and wear particles generated from the reduction mechanism 22 and so forth can be prevented from penetrating to the lower storage portion 10a where the SBW-ECU 53 and the AT-ECU 56 are accommodated.

The automatic transmission control unit of the present invention was described in the context of an embodiment; however, the present invention is not limited to such, and may be applied with modification as appropriate provided that such modifications do not contradict the technical concept of the present invention.

The automatic transmission control unit according to the present invention is suitable for use as an automatic transmission control unit, which includes an actuator that changes a travel range of an automatic transmission for a vehicle; a shift-by-wire control circuit that controls the actuator based on a selected range selected by a driver; and an automatic transmission control circuit that controls various valves of a hydraulic control device of the automatic transmission.

According to an exemplary aspect of the invention, a shift-by-wire control circuit and an automatic transmission control circuit are accommodated in a storage portion, which is separate from a storage portion that accommodates a motor, within one case. There is thus no need to provide respective onboard spaces, and similar circuit functions can also be used in common. According to the automatic transmission control unit, it is therefore possible to achieve downsizing and a reduction in manufacturing costs. In addition, since the shift-by-wire control circuit and the automatic transmission control circuit are accommodated in the same storage portion, lubricant, wear particles, and the like from the motor can be prevented from penetrating to the space of the shift-by-wire control circuit and the automatic transmission control circuit.

According to an exemplary aspect of the invention, the automatic transmission control unit further includes: a connector that is provided on an end of the storage portion accommodating the shift-by-wire control circuit and the automatic transmission control circuit, and that electrically connects the shift-by-wire control circuit and the automatic transmission control circuit with a power source, wherein a positional relationship of the connector with the shift-by-wire control circuit and the automatic transmission control circuit is such that the shift-by-wire control circuit is disposed closer than the automatic transmission control circuit to the connector. Accordingly, the effect of more noise generated from the shift-by-wire control circuit due to higher power consumption than the automatic transmission control circuit in order to control a drive current of the motor can be reduced in comparison to when the automatic transmission control circuit is disposed closer than the shift-by-wire control circuit to the connector. This also makes it possible to reduce a reading error caused by noise generated in a position sensor of an automatic transmission, which is disposed near the automatic transmission control circuit. In addition, there is no need to enact noise countermeasures such as using shielding wire for a harness through which the drive current of the motor flows.

According to an exemplary aspect of the invention, the shift-by-wire control circuit and the automatic transmission control circuit are mounted on one printed circuit board. Therefore, a compact space and the common use of similar circuit functions can be easily realized.

According to an exemplary aspect of the invention, an upper storage portion accommodating the motor and a lower storage portion accommodating the shift-by-wire control circuit and the automatic transmission control circuit are integratedly joined, and fixed to a case of the automatic transmission. There is thus no need to provide respective onboard spaces for the control circuits, and similar circuit functions can also be used in common.

According to an exemplary aspect of the invention, the lower storage portion accommodating the shift-by-wire control circuit and the automatic transmission control circuit is provided with a resin portion embedded with a conductor that electrically connects the motor and the printed circuit board. Therefore, an actuator drive current can flow through the conductor instead of an inner layer pattern of the printed circuit board, thereby downsizing the printed circuit board and also eliminating the need for shielding wire as a noise countermeasure.

According to an exemplary aspect of the invention, the upper storage portion accommodating the motor further accommodates a reduction mechanism that decelerates a rotation of the motor, and a motion conversion mechanism that converts the rotation decelerated by the reduction mechanism into an oscillating motion that is transferred to a range changeover member. Therefore, lubricant present among the motor and wear particles generated from the reduction mechanism and so forth can be prevented from penetrating to the space of the shift-by-wire control circuit and the automatic transmission control circuit.

The invention claimed is:

1. An automatic transmission control unit comprising:
    a shift-by-wire control circuit that inputs an electrical signal based on a selected range selected by a driver, changes a range changeover member of an automatic transmission using the rotation of a motor to a predetermined position based on the electrical signal, and outputs a first signal that drives the motor so as to achieve a travel range;
    an automatic transmission control circuit that inputs the electrical signal based on the selected range and a second signal based on a vehicle state and outputs a third signal for controlling the automatic transmission in order to achieve the travel range,
        wherein the shift-by-wire control circuit and the automatic transmission control circuit are accommodated in one storage portion;
    a connector that is provided on an end of the one storage portion accommodating the shift-by-wire control circuit and the automatic transmission control circuit, and that electrically connects the shift-by-wire control circuit and the automatic transmission control circuit with a power source,
        wherein a positional relationship of the connector, the shift-by-wire control circuit and the automatic transmission control circuit is such that the shift-by-wire control circuit is disposed closer to the connector than the automatic transmission control circuit.

2. The automatic transmission control unit according to claim 1, wherein the shift-by-wire control circuit and the automatic transmission control circuit are mounted on one printed circuit board.

3. The automatic transmission control unit according to claim 1, wherein:
    the one storage portion is a lower storage portion, and
    an upper storage portion accommodating the motor and the lower storage portion accommodating the shift-by-wire control circuit and the automatic transmission control circuit are integratedly joined, and fixed to a case of the automatic transmission.

4. The automatic transmission control unit according to claim 3, wherein the lower storage portion accommodating the shift-by-wire control circuit and the automatic transmission control circuit is provided with a resin portion embedded with a conductor that electrically connects the motor and a printed circuit board.

5. The automatic transmission control unit according to claim 3, wherein the upper storage portion accommodating the motor further accommodates a reduction mechanism that decelerates a rotation of the motor, and a motion conversion mechanism that converts the rotation decelerated by the reduction mechanism into an oscillating motion that is transferred to the range changeover member.

6. The automatic transmission control unit according to claim 1, wherein the one storage portion accommodating the shift-by-wire control circuit and the automatic transmission control circuit is provided with a resin portion embedded with a conductor that electrically connects the motor and a printed circuit board.

7. The automatic transmission control unit according to claim 1, wherein another storage portion accommodating the motor further accommodates a reduction mechanism that decelerates a rotation of the motor, and a motion conversion mechanism that converts the rotation decelerated by the reduction mechanism into an oscillating motion that is transferred to the range changeover member.

8. The automatic transmission control unit according to claim 1, further comprising:
    a separation wall, wherein:
        the motor is disposed on one side of the separation wall, and the shift-by-wire control circuit and the automatic transmission control circuit are disposed on another side of the separation wall, and the separation wall forms the one storage portion.

9. The automatic transmission control unit according to claim 1, further comprising:
   a case body;
   an inner lid with a separation wall; and
   a lid, wherein:
   the case body and the separation wall form the one storage portion, and
   the lid and the separation wall form another storage portion.

* * * * *